Dec. 12, 1944.  C. MOTT ET AL  2,364,645
TORCH DEVICE
Filed March 31, 1942  3 Sheets-Sheet 1

INVENTOR
CHESTER MOTT
ALFRED F. CHOUINARD
ROBERT L. HARDING
BY
ATTORNEYS

Dec. 12, 1944. C. MOTT ET AL 2,364,645
TORCH DEVICE
Filed March 31, 1942 3 Sheets-Sheet 3

INVENTOR
CHESTER MOTT
ALFRED F. CHOUINARD
ROBERT L. HARDING
BY
Dean Fairbank Hirsch
ATTORNEYS

Patented Dec. 12, 1944

2,364,645

UNITED STATES PATENT OFFICE 2,364,645

TORCH DEVICE

Chester Mott, Evanston, and Alfred F. Chouinard and Robert L. Harding, Chicago, Ill., assignors to National Cylinder Gas Company, Chicago, Ill., a corporation of Delaware Application March 31, 1942, Serial No. 436,974

17 Claims. (Cl. 266—23)

The present invention relates to a torch device of the type in which a gas flame from a torch tip is directed towards the surface of a metal workpiece for cutting, welding, flame hardening or the like.

One object of the present invention is to provide a new and improved torch device, having means for controlling or indicating certain conditions or initiating certain operations in said device in accordance with the electrical conductivity of the gas flame.

Another object is to provide a torch device of the character described, having new and improved means by which the torch tip can be maintained or controlled at a preset distance from the work surface during operations irrespective of irregularities in said surface.

Another object is to provide a torch device of the type described having new and improved means for automatically and accurately distancing the torch tip from the work surface within preset limits during operations.

Another object is to provide a torch device of the type described having new and improved means for indicating changes that may occur during operations in the preset position of the torch tip with respect to the work surface.

A further object is to provide a torch device of the type described having means by which the torch tip can be maintained either automatically or manually between preset limits at a distance from the work surface, without the use of any gauges or similar device riding over said surface.

A further object is to provide a torch tip distancing device which is accurately controlled at any instance of operation directly in accordance with the distance of the torch tip from that section of the work surface which is directly opposite the tip at that instance.

In carrying out the features of the present invention, the gas flame from the torch tip is utilized as part of an electric circuit to control current conditions in said circuit. The electrical conductivity of the flame varies inversely as the length thereof, and this flame length increases with increasing size of preheating orifices. Therefore, as the distance from tip to plate is changed, the current conditions in the circuit are also changed. This change in the circuit is employed to automatically maintain the torch tip at a predetermined distance from the work surface in one embodiment of the invention, or to indicate to the operator movement of the torch tip transverse to said surface and beyond preset limits in another embodiment.

The conductivity of the gas flame also depends on the proportion of the heating combustible gases and on the thermal potentials resulting from the heating of the workpiece. These additional factors controlling the conductivity of the flame can be utilized in accordance with the present invention to indicate or control other conditions or initiate certain other operations which depend on these factors. For instance, the present invention may be employed to indicate the gas ratio or to automatically turn on the high pressure cutting oxygen after the metal workpiece has been preheated to the proper temperature.

Various other objects, features and advantages of the invention will be apparent from the following particular description, and from an inspection of the accompanying drawings, in which

Fig. 8 is a wiring diagram for automatically controlling the distance of the torch tips from the work surface in a torch cutting machine.

Figure 1:
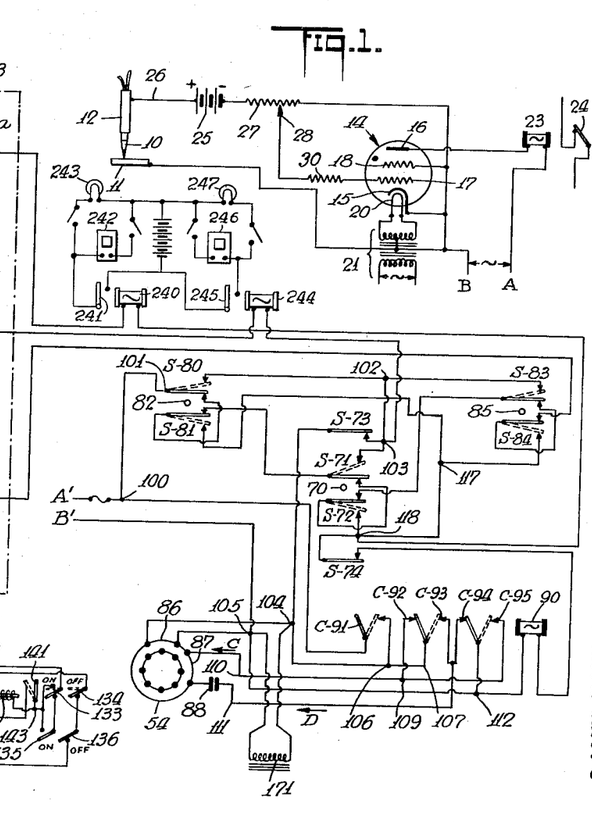
Fig. 1 is a somewhat simplified schematic diagram of a system incorporating the features of the present invention.

In Fig. 1 is shown a simplified circuit designed in accordance with the present invention for controlling, indicating or initiating certain operations of a torch device in which a torch flame 12 having a tip 10 travels over a metal workpiece for cutting, welding, flame hardening or the like. The torch frame 12 as well as the workpiece 11 are connected into this circuit, so that the gas flame from the torch tip 10 forms part of the conducting path of said circuit. The electrical conductivity of this flame depends on the proportions of the gas mixture. In a cutting machine, the conductivity of the gas flame would depend on the ratio between the preheat oxygen and the fuel gas. For optimum preheating conditions, the preheating oxygen and fuel gas are proportioned in a cutting machine to maintain a so-called neutral flame. Once this proportion has been set, it is not changed.

Another factor which affects the conductivity of the gas flame is the thermal potentials and all allied effects resulting from the heating of the workpiece 11 during cutting operations. After the workpiece 11 has been heated to the proper kindling temperature, the conductivity of the gas flame due directly to the thermal potentials and all allied effects remains constant over the desired working range.

Another factor which affects the electrical conductivity of the gas flame is its length. This flame conductivity varies inversely as the length thereof.

Variations in the conductivity of the gas flame are therefore indications of changes in the proportion of the gas mixture, changes in the temperature of the workpiece 11 or changes in the effective distance of the torch tip 10 from the work surface. By maintaining any two of these factors affecting the conductivity of the flame constant, any variation in the flame conductivity would be a direct measure of changes in the third factor. This third factor can thereby be controlled, its changes indicated or certain operations automatically initiated when said factor reaches a predetermined value.

The system shown in Fig. 1 includes a device 14 for making and breaking a control circuit in accordance with the conductivity of the gas flame. This make or break condition of the control circuit may be employed to control a motor which raises or lowers the torch 12, to operate an indicating device or to automatically initiate certain operations as will be more fully described hereinafter.

As a further feature of the present invention, the control device 14 is in the form of a thermionic governor or valve shown as a hot cathode gas tetrode tube having a cathode 15, an anode 16 and a control grid 17 between said cathode and said anode. A screen grid 18 may be provided serving as a shield between the control grid 17 and the anode 16, and also serving to reduce the interelectrode capacity within the tube. A filament 20 in the tube connected across the secondary coil of a transformer 21 serves to warm the cathode 15, so that said cathode emits electrons having a negative charge. The anode 16 has a positive potential connected to it, so that the electrons emitted by the cathode 15 will be attracted to said anode. Once this electron flow is created between the cathode 15 and the anode 16, a conductive circuit is established through the tube 14 between these electrodes. A relay coil 23 controlling a switch 24 is connected to the anode circuit of the electrodes 15 and 16, so that when electron flow is established in the tube 14 between these electrodes, current will flow from main A through relay coil 23 to anode 16, across the conductive path provided by the electron flow to cathode 15, and then to the main B. The switch 24 may be in the circuit of the motor which controls the vertical movement of the torch 12, or may be in the circuit of an indicating or other operating device as will be more fully set forth.

The grid 17 controls the electron flow passing therethrough. If this control grid 17 is sufficiently negative in potential, it will repel the negative electrons from the cathode 15. Any slight change below or above the critical potential of control grid 17 will act as a governing device for the flow or stoppage of flow of the electrons reaching anode 16.

The tube 14 in the specific form shown is gas filled and designed with sharp cut-off features, so that once an electron flow is established between the cathode 15 and anode 16, the gas in the tube becomes ionized and provides a greater conducting path and a larger number of free electrons than can be supplied by the hot cathode alone. Furthermore, with this type of tube, at a certain value of potential on the anode 16 there is established a certain critical potential for the control grid 17, at which value the tube becomes conductive.

Another characteristic of these gas filled tubes is that once plate current (i. e., electron flow) is established, the grid 17 will not regain control by becoming more negative as long as there is a positive potential applied to anode 16. Consequently, the only way in which control may be returned to the grid 17 is by removing or reducing the potential at the anode 16. This is accomplished by applying at mains A, B a source of alternating current, so that control is returned to the grid 17 sixty times a second, assuming that the current applied at these mains is sixty cycles and the grid voltage has reached a value sufficient to attain this control.

In the grid control circuit is a battery 25, the positive side of which is connected to the metallic part of the torch 12 through a conductor 26, while the negative side is connected to the cathode 15 through a potentiometer 27. The slider 28 of this potentiometer is connected to the control grid 17 through a current limiting resistor 30.

With the circuit arrangement shown in Fig. 1, and assuming that the preheat gases are lit and burning, there will exist a certain negative potential at the control grid 17. If this negative potential exceeds a certain optimum value (for one set value of anode voltage), this control grid 17 will prevent the tube 14 from conducting current. If this negative potential on the control grid 17 is less negative than this certain optimum value, then the grid 17 will not have control of the tube 14 and current will flow in the anode circuit. As the slider 28 is moved towards the right, the value of the negative bias potential applied to the control grid 17 will be lessened, and at some point along the resistor 27, the tube 14 will begin to conduct anode current.

With the torch set so that the tip 10 is at the desired distance from the workpiece 11, if the slider 28 is moved along the resistor 27 to a point just before the tube 14 becomes conductive, then if this distance should be increased, the negative potential at the control grid 17 will be decreased to a point at which the tube 14 begins to fire (i. e., becomes conductive), so that the anode circuit is closed by conduction through the tube, the relay 23 is energized and the switch 24 is closed.

If the slider 28 is set to a point on the resistor 27 so that the tube 14 is just conducting, then if the distance between the torch tip 10 and the surface of the workpiece 11 should be reduced, the negative potential at the grid 17 will be incerased to a value which will prevent the tube 14 from conducting, so that the anode circuit will be opened, the relay 23 deenergized and the switch 24 opened.

It is seen therefore, that the system of Fig. 1 can be utilized to make or break the anode circuit in accordance with variations in the electrical conductivity of the gas flame. This operation of the anode circuit can, for instance, be employed to control or indicate the movement of the torch tip 10 towards or away from the workpiece 11, as has been made apparent and as will be explained more fully in connection with the cutting machine shown in Figs. 2 to 8. As another example of the adaptability of the system of Fig. 1, it may be used to control the turning on of the high pressure cutting oxygen. For this purpose the torch tip 10 would be properly positioned over the metal to be cut, and the preheat gases turned on, lighted and adjusted for the proper flame characteristics. Then when the metal has reached the proper kindling temperature, and the conductivity of the flame increased to a corresponding value, the tube 14 would become non-conductive, the anode circuit opened and the relay 23 deenergized. This deenergized relay 23 may be made to close the contacts controlling a solenoid operated high pressure oxygen valve. Preheating periods would thereby be cut to the operating minimum, excessive burning of the plate edges would be eliminated, and the machine would be operated at its maximum output.

Figure 2:
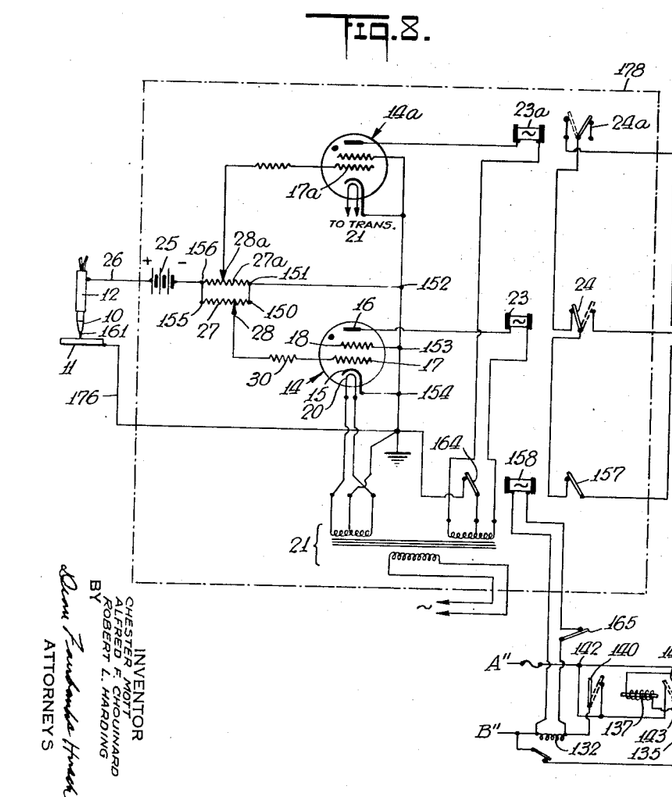
Fig. 2 is a perspective front view somewhat diagrammatic of a torch cutting machine incorporating the torch tip distancing control features of the present invention.
Figure 3:
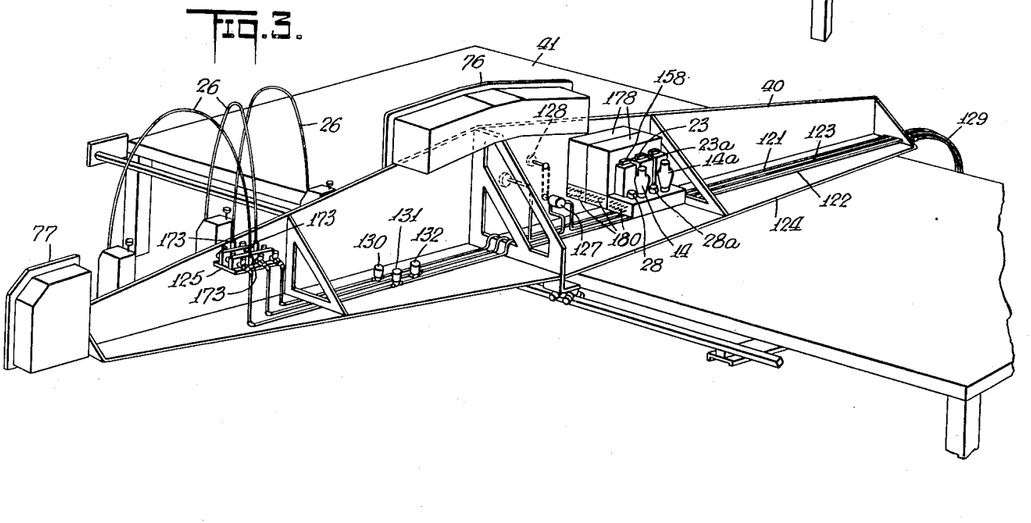
Fig. 3 is a perspective rear view somewhat diagrammatic of the torch cutting machine of Fig. 2, but showing the work table and the torch crosshead hose removed.
Figures 4, 5, 6, 7:
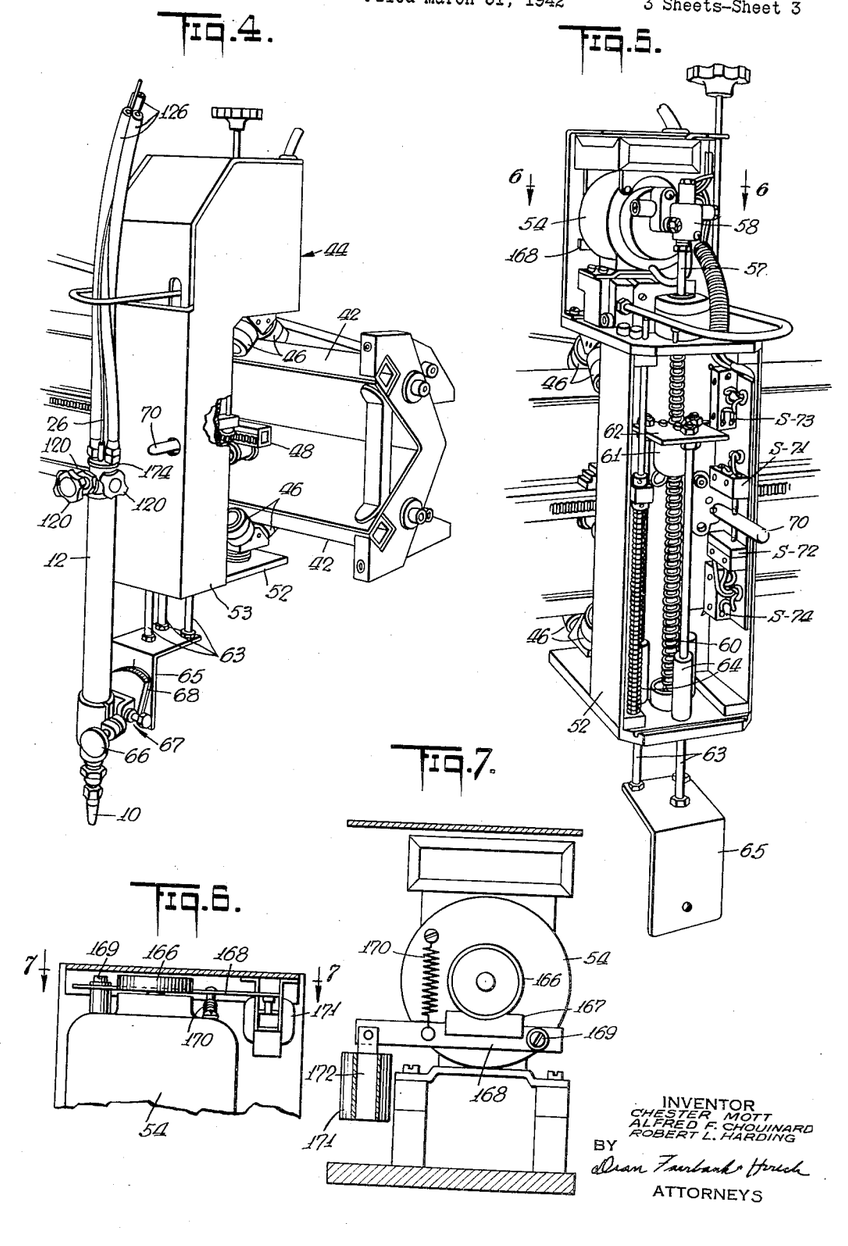
Fig. 4 is a perspective view showing an end portion of the torch carriage with a torch crosshead unit supported thereon.
Fig. 5 is a perspective view showing one torch crosshead unit with part of its casing removed to reveal the interior thereof.
Fig. 6 is a section taken on line 6—6 of Fig. 5.
Fig. 7 is a section taken on line 7—7 of Fig. 6.

As an example of the type of torch device in which the basic principles of our invention shown in Fig. 1 may be employed, we have shown somewhat schematically in Figs. 2 and 3 and more in detail in Figs. 4 and 5 a cutting apparatus of the form shown and claimed in Patents 2,336,596 and 2,356,215 granted on copending applications Serial Nos. 378,102 and 389,404. This cutting apparatus includes a carriage 40, which travels horizontally on rails over a table 41 on which may be supported a templet, drawing, pattern or other guide, and which projects beyond said table. The carriage 40 is provided with a beam having parallel superposed rails 42, which support a tracing mechanism 43 and a plurality of spaced torch crosshead units 44, and which guide them along the carriage in a horizontal direction at right angles to the direction of movement of said carriage. These crosshead units 44, three of which are shown, travel in unison over the workpiece 11 resting on a table 45, and carry respective torches 12 for duplicate cutting of said workpiece. Each crosshead unit 44 is provided with two superposed pairs of guide rollers 46 riding over the rails 42.

The tracing mechanism 43 may be of the well-known type, or may be of the form shown and claimed in Patent 2,336,626 granted on companion application Serial No. 395,616. This mechanism has a tracing element 47 in the form of a tracer wheel, pointer, spotlight or the like, which is steered along the outline of the pattern or other guide to be copied or traced, and which may be driven by a motor, so that it acts as a traction wheel to move the carriage and the torches on the carriage.

The movement of the tracing element 47 with respect to the carriage 40 is transmitted to the torch crosshead units 44 through a bar 48, which is adjustably secured to the tracing mechanism 43 and to the crosshead units 44 in a manner, for instance, as shown in Patent 2,336,596 granted on copending application Serial No. 378,102. With this construction, the actual movement of the tracing element 47 is duplicated by each of the crosshead units 44.

Each of the torch crosshead units 44 includes a frame structure shown in the form of a box-like casing 52, and an outer removable cover 53 U-shaped in cross-section and telescopically fitted around the casing 52 as shown in Fig. 4. This cover 53 forms in conjunction with the frame casing 52 a housing for a torch adjusting motor 54 and other operating parts to be described.

The means for manually effecting the elevational adjustment of each torch 12 with respect to the workpiece 11 is disclosed and claimed in Patent 2,336,596, and includes a vertical shaft 57 driven from the motor 54 through a suitable reduction gear unit 58, and secured to a suitably journalled lead screw 60 extending vertically in the frame casing 52. Threaded on this lead screw 60 is a nut 61 to which is connected a plate 62. Rigid with this plate 62 are three guide rods 63 slidably passing through respective guide sleeves 64 fixed to the bottom wall of the frame casing 52. Connected to the lower ends of these guide rods 63 is an angle bracket 65 having a horizontal flange connected to said guide rods, and a vertical flange to which the torch 12 may be secured in any desired adjusted position. The torch 12 may be vertically adjusted with respect to the bracket 65 and clamped in position by a screw 66 which is mounted on a clamp 67 by which said torch is fastened to said bracket. This clamp 67 is insulated from the bracket 65 by an insulating disc 68, and the fastening member (not shown) by which said clamp is fixed to said bracket is also insulated so that the torch 12 is insulated from the crosshead frame. Suitable means for angularly adjusting the torch 12 may also be provided.

When the motor 54 is driven, the lead screw 60 is turned to move the nut 61 therealong and the guide rods 63 endwise, so that the torch 12 is adjusted up and down as desired. The lead screw 60 and lead nut 61 form self-locking means by which downward slipping of the torch 12 from the desired elevational position is prevented when the motor 54 is deenergized.

The motor 54 is of the reversible type, and each of the crossheads carries a switching device by which this motor may be operated in either direction. As shown, this device includes a switch lever 70 disposed between a pair of motor circuit switches S—71 and S—72. The switch S—71 closes one circuit of the motor 54 to run said motor in one direction and raise the torch 12, while the switch S—72 closes the other circuit of said motor to run the motor in the opposite direction and thereby lower the torch.

To prevent accidental jamming of the parts or stalling of the motor 54 when the nut 61 reaches the upper or lower limits of its movement, there are provided limit switches S—73 and S—74 which are operated by the nut 61 or associated parts. These switches are normally closed, but one or the other is opened to break the circuits and stop the motor 54 if either switch S—71 or S—72 is held closed for too long a time.

The operation of the motors 54 by which the raising or lowering of the several torches 12 is manually effected, may be controlled from either one of a plurality of control stations. All of the motors 54 may be controlled from a main control panel 76 (Figs. 2 and 3) adjacent to the tracing mechanism 43 and secured to the carriage 40, or from an auxiliary control panel 77 fixed to the free end of said carriage, and the motor 54 of each individual crosshead unit 44 can be controlled by its own switch lever as above described.

The right half of the wiring diagram in Fig. 8 shows one way in which the individual crosshead motors 54 may be manually controlled from a plurality of control stations. Similar wiring could be employed for each crosshead motor 54.

If the carriage 40 is provided with three crosshead units 44, the main control panel 76 has three pairs of switches, one pair for each motor; the auxiliary control panel 77 also has three pairs of switches, one for each motor; and each crosshead unit 44 has a pair of switches for its own motor as already described. The two switches of each pair are arranged in superposed relationship, and each pair has a single vertically movable operating handle. On the main control panel 76, each upper switch S—80 controls the raising of the corresponding torch 12, and each lower switch S—81 controls the lowering of said torch. Each pair has a single lever 82. On the auxiliary control panel 77, each pair of switches S—83 and S—84 is arranged in similar superposed relationship and with a single lever 85 therebetween.

The direction of rotation of the motor 54 is controlled from the switch levers 70, 82 and 85 according to whether they are pushed up or down from normal position. Each motor 54 may be of the single-phase reversing type with two stator windings 86 and 87, and with a condenser 88 in series with the winding 87.

The current to the system is supplied by the mains A', B'. A relay mounted in each crosshead unit includes an electro-magnetic coil 90 and contacts C—91, C—92, C—93, C—94 and C—95 operated mechanically by the armature of the relay 90.

The blades of the various switches and of the relay contacts described are shown in solid lines in normal position with the motor 54 at rest and the coil 90 of the relay deenergized. They may be moved to the dotted-line position to control the circuit as will be explained.

To raise any torch 12 from the main control panel 76, the corresponding lever 82 is raised to move the contact blade of its upper switch S—80 into upper dotted position, so that the current flows from main A' to points 100 and 101, through switch S—80 in dotted position to points 102 and 103, through switch S—73 to point 104. From this point 104, the current divides and follows a parallel path. One branch of this parallel circuit continues from point 104 through winding 86 to point 105, and returns to main B'. The other parallel branch continues from point 104 to points 106 and 107, through contact C—92 to points 109 and 110, through winding 87 in the direction indicated by arrow C to point 111, through contact C—94 to points 112 and 105, and to the main B'. The motor 54 is thereby driven in a direction determined by the direction of current flow in the windings 87, and the lead screw 60 rotated in a corresponding direction to raise the nut 61 and the torch 12. When the torch 12 reaches the desired elevation, the lever 82 is released, and will automatically return to neutral position, and the circuit restored to the open neutral position indicated in full lines, so that the motor 54 is stopped.

To raise the torch 12 from the auxiliary control panel 77, the lever 85 on said panel corresponding to the torch to be raised is lifted to move the contact blade of the upper switch S—83 in the dotted position shown. Under these conditions, the current flows from main A' to points 100 and 101, through switches S—80, S—81, S—71 and S—72 in full line positions shown, through switch S—83 in dotted position to points 102 and 103, through switch S—73 and to point 104. From this point 104, the current travels in the same direction as was described previously.

To raise the torch 12 from the control on its respective crosshead, the lever 70 is raised to move the contact blade of the upper switch S—71 into dotted position shown. In this position, the current flows from main A' to point 101, through switches S—80 and S—81 in full line positions, through switch S—71 in dotted position to point 103, through switch S—73 to point 104. From this point 104, the current travel is the same as was previously described.

If the nut 61 reaches its upper limit before the operating control levers 70, 82 and 85 are released, a pin on said nut will lift the contact blade of the safety switch S—73 to open the circuit of the motor windings 86 and 87, and thereby stop the motor 54.

To lower any torch 12 from the main control panel 76, the corresponding lever 82 is lowered to move the contact blade of the respective lower switch S—81. In this lowered position of the lever 82, the current flows from main A' to points 100 and 101, through switch S—80 in full line position, through switch S—81 in dotted position to points 117 and 118, through switch S—74, through relay coil 90 to points 112 and 105 and to main B'. This actuation of switch S—81 energizes relay coil 90, and causes the contact blades of the relay switches to be shifted into the dotted line position shown, so that contacts C—92 and C—94 are opened, and contacts C—91, C—93 and C—95 are closed. With contact C—91 closed in the dotted line position shown, the current flows from main A' through contact C—91 in dotted position, and to point 106. From point 106, the current travels along parallel paths to main B'. One branch of this parallel circuit is from point 106 to point 104, through the motor winding 86 to point 105, and then to main B'. The other branch of this parallel circuit is from point 106 to point 107, through contact C—93 in dotted line position to point 111, through the field winding 87 in the direction indicated by the arrow D to point 109, through contact C—95 in dotted position to point 112 and 105, and out through main B'. It will be seen that the current flow through the field winding 86 is always in the same direction, while the current flow through the field winding 87 changes depending upon whether it is desired to have the torch raised or lowered.

To lower any torch 12 from auxiliary control panel 77, the corresponding lever 85 is lowered to move the contact blade of the respective switch S—84 into dotted line position shown. In this lowered position of the lever 85, the current flows from main A', through switches S—80, S—81, S—71, S—72 and S—73 in full line positions shown, through switch S—84 in dotted line position shown to point 117, through switch S—74, and through the relay 90. From here the current flows in the manner described in connection with the torch lowering actuation of switch S—81.

To lower the torch 12 from the control on its respective crosshead, the corresponding lever 70 is lowered to move the contact blade of the lower switch S—72 into dotted position shown, so that the current flows from main A' through switches S—80, S—81 and S—71 in full line positions shown, through switch S—72 in dotted position shown to point 118, through switch 74 and through the relay coil 90. From here the current flows in the manner described in connection with the torch lowering actuation of switch S—81.

If the nut 61 reaches its lower limit before the switch levers 70, 82 and 85 are released, a pin on said nut will push down the contact blade of the safety switch S—74 to stop the motor 54.

As a feature of the present invention, the automatic distancing control of the torch tip 10 is operated only after the high pressure cutting oxygen has been turned on. The method for controlling the high pressure cutting oxygen and preheat gases to the torch or torches of the cutting machine may, for instance, be of the type shown in Patent 2,356,215 granted on copending application Serial No. 389,404. In this construction, each of the torches 12 is provided with the usual conduits for respectively delivering preheat fuel gas such as acetylene, low pressure oxygen and high pressure cutting oxygen to the torch tip 10, these conduits being controlled by respective hand valves 120. Three rigid pipes 121, 122 and 123 (Fig. 3) extending side by side along the rear carriage base 124 deliver the three gases respectively from one end of the carriage 40 to a discharge section substantially midway of the projecting part of the carriage, and are connected at said section to a manifold unit 125 by detachable fittings. At the other inlet end, the pipes 121, 122 and 123 are connected by flexible hose 129 to respective gas supply tanks (not shown). The manifold unit 125 is shown affixed to the front frame plate of the carriage 40 above the base 124, and has its three inlets connected directly to the outlet ends of the gas supply pipes 121, 122 and 123. The gas from the manifold unit 125 is piped from the outlets of said unit to the respective torches 12 by flexible hose 126 (Figs. 2 and 4).

A valve 127 in the high pressure cutting oxygen line 123 regulates the pressure in said line according to the thickness of the plate to be cut, and is operated from a hand wheel 128.

The pressure in the preheat gas lines 121 and 122 may be regulated in any suitable manner, as for instance, from the supply tanks. These preheat gas lines 121 and 122 are provided with respective valves 130 and 131, and the high pressure cutting oxygen line 123 is provided with a similar valve 132. These valves 130, 131 and 132 are of the quick-acting type, as for instance of the solenoid operated type, and are controlled from the panels 76 or 77. The panel 76 carries switches 133 and 134 controlling the opening and closing of the high pressure cutting oxygen valve 132, and also carries the necessary switches for operating the preheat gas valves. The other panel 77 carries switches 135 and 136 controlling the opening and closing of the high pressure cutting oxygen valve 132, and also carries the switches for controlling the preheat gas valves. The lower middle part of the wiring diagram in Fig. 8 shows the desirable manner by which the high pressure cutting oxygen valve 132 may be controlled. The various switches and contacts in this diagram are shown in full line position with the valve 132 closed, so that no high pressure cutting oxygen is flowing into the manifold unit 125. To open up the valve 132 from the panel 76, the switch 133 is reversed into dotted position shown, so that current flows from the main A" through said switch in dotted position, through relay coil 137, through switches 134 and 136 in full line position, and out through main B". The energized coil 137 causes closure of contacts 140 and 141 into dotted position shown, so that current flows between points 142 and 143 through parallel branches. One of the branch currents flows from point 142 through switch 133 in dotted line position to point 143. The other branch current flows from point 142 through contact 141 in dotted line position to point 143. The closure of the contact 141 into dotted position shown serves to maintain the relay coil 137 energized, even after switch 133 has been returned into full line position, so that contact 140 will also remain closed in dotted position. As long as contact 140 is in this closed position, current will flow from main A" to point 142, through contact 140 in dotted position, and through the solenoid of the high pressure cutting oxygen valve 132. The energization of this solenoid opens up this valve 132, so that flow of cutting oxygen to the torch tip 10 is assured.

The opening of the cutting oxygen valve 132 can also be accomplished by moving the switch 135 on the panel 77 into reverse position from that shown.

The automatic tip distancing control system of the present invention is connected to and cooperates with the manual torch raising and lowering control and with the cutting oxygen control in a manner to be described. This automatic tip distancing control system comprises two thermionic valves 14 and 14a (Fig. 8) connected in such a manner that one of said valves controls the lower limit of movement of the torch 12, while the other valve controls the upper limit of movement of said torch. These thermionic valves 14 and 14a are of the hot cathode gas tetrode type described with reference to the basic circuit shown in Fig. 1 and are operated in a similar manner. Potentiometers 27 and 27a in the respective circuits of these tubes 14 and 14a are connected in parallel, with their respective sliders 28 and 28a connected to the control grids 17 and 17a of the respective tubes.

In the operation of the system shown in Fig. 8 as the points 150, 151, 152, 153 and 154 are all connected together, there is no difference in potential between any of these points. Therefore, if the slider 28 is placed at point 155, there will exist the same potential difference across the input terminals of the tube 14 at the control grid 17 and the cathode terminal connection 154 as is available between points 155 and 150. With the battery 25 connected into the circuit as shown, there will be a negative bias potential applied to the grid 17. As the slider 28 is gradually moved from point 155 in the direction of point 150, the value of the negative bias potential applied to the grid 17 will gradually decrease. As this negative grid bias potential decreases, the tube 14 approaches closer to its point of conductivity. A similar situation exists with respect to the tube 14a as the slider 28a is moved from point 156 to point 151.

With the torch tip 10 located the proper distance above the metal plate 11 and at its lowest limit for optimum cutting conditions, the slider 28 is moved towards point 150, and when said slider is just over the dividing line separating the conditions of non-conductivity and conductivity of the tube 14, the circuit of said tube is considered to be adjusted. Under these conditions, the tube 14 is now conducting and the relay 23 is energized.

By the same method of adjustment, the circuit of the tube 14a is adjusted by positioning the slider 28a on the potentiometer resistor 27a, so that the tube 14a is almost but not quite conducting while the tip 10 is set at its proper limit for optimum cutting conditions. Under these conditions, the grid bias potential of the tube 14a has a slightly greater negative value than the value required for the grid 17a of the tube 14a to lose control and allow the anode circuit of said tube to become conducting. With the circuit of the tube 14a adjusted as stated, there is no anode current flowing, and the relay 23a remains deenergized.

The two tube circuits adjusted as described provide the conditions for maintaining the height of the tip 10 between preset limits above the plate 11 for optimum cutting conditions. With the relay 23 energized and relay 23a deenergized, the switches 24 and 24a operated by these relays respectively are in the position indicated in full lines.

The two switches 24 and 24a are connected in series with a switch 157 operated from a relay 158 connected in parallel across the coil of the high pressure cutting oxygen valve 132. One of the terminals of the switch 157 is connected to one of the poles of the switch S-84 of the manual torch elevational control previously described; one of the terminals of the switch 24 is connected to the point 103 of this control; and one of the terminals of the switch 24a is connected to the point 118 of said control.

Assuming that the switches of the manual torch elevational control are in the full line positions shown in Fig. 8, then current will be available at the switch S-84, so that current may flow from the main A', through said switch in full line position shown, through the switch 157, through the switches 24 and 24a in full line positions shown. Since the circuit terminates at the switch 24a in the full line position shown, no current will be applied to the motor 54 in the crosshead.

Assuming that the torch 12 with its tip 10 is moving over the plate 11 during cutting operations, and the distance between said tip and said plate decreases, the flame path 161 between the tip and the plate will decrease and the equivalent resistance of the path 161 will decrease. Any decrease in this flame resistance will decrease the total resistance of the series path formed by the battery 25, the flame path 161 and the two parallel connected resistances 27 and 27a. Consequently, under these conditions, there will be a greater proportion of the total voltage drop in this series circuit across the two parallel resistors 27 and 27a, this being the electrical equivalent of mechanically moving the sliders 28 and 28a towards the points 155 and 156. Therefore, with this decrease in flame path resistance, there is an increase in negative bias potential applied to the grids 17 and 17a of the tubes 14 and 14a respectively. Since the tube 14a is not conducting anode current at the optimum cutting height, an increase in negative bias on grid 17a will not change its condition of operation, and relay 23a will remain deenergized. However, since the tube 14 was initially adjusted so that the negative bias at grid 17 was not quite enough to prevent the tube from conducting current in its anode circuit, an increase in negative bias at the grid 17 will render the tube 14 non-conducting, so that the relay 23 will become deenergized. When this occurs, the relay switch 24 will be moved into the dotted position shown. Under these conditions, the current that is available from the switch S-84 flows through the switch 157, through switch 24 in the dotted line position shown to point 103. When current is made available at this point 103, the crosshead motor 54 will be actuated to raise the torch 12 and the tip 10. When this tip is raised to a point within predetermined limits, the original electrical conditions in the automatic control circuit are restored. Under these restored conditions, the tube 14a will be returned to its initial value of negative bias, with the relay 23a remaining deenergized, while the tube 14 is again negatively biased to the point where it is just barely conducting, and relay 23 is energized. Under these restored conditions, no current will be supplied to the crosshead motor 54.

If, while the torch 12 with associated tip 10 is moving over the plate 11, the distance between the tip and the plate increases, the flame path 161 will also increase, so that the equivalent resistance of this path will be increased. Increase in this flame resistance will increase the total resistance of the series path formed by the battery 25, the flame path 161 and the two parallel resistors 27 and 27a. Consequently, there will be a lesser proportion of the total voltage drop in this series circuit across the two resistors 27 and 27a, and this will be electrically equivalent to mechanically moving the sliders 28 and 28a towards the points 150 and 151, so that there is a decrease of negative bias potential applied to the grids 17 and 17a of the tubes 14 and 14a respectively.

Since the tube 14 was conducting anode current at the optimum cutting height, a decrease in negative bias on grid 17 will not change its condition of operation, and relay 23 will remain energized. However, since the tube 14a was initially adjusted so that the negative bias potential on grid 17a was just enough to prevent the tube from conducting current in the anode circuit, a decrease in the negative bias on said tube will cause said tube to conduct current in its anode circuit, and thereby cause energization of the relay 23a. With the relay 23a energized, the switch 24a will be moved into the dotted position shown. Under these conditions, the current that was available at the switch S-84 flows through switch 157, through switch 24 in full line position shown, through switch 24a in dotted position shown and to point 118. With the current available at 118, the crosshead motor 54 is actuated to lower the torch 12 and the tip 10 as has been already described. When the tip 10 is lowered until it again falls within predetermined limits, the original electrical conditions are restored to the series circuit of the control system. Under these initial conditions, the tube 14a is returned to its initial value of negative bias, and relay 23a is again deenergized, while the tube 14 is still negatively biased to a point where it is just barely conducting, and relay 23 remains energized. Under these restored conditions, no current is supplied to the crosshead motor 54.

With the power to the automatic tip distancing device obtained from the upper pole of the switch S—84, power will be available to this device only as long as the device for manually controlling the raising and lowering of the torch is not operated and the switches S—71, S—72, S—80, S—81, S—83 and S—84 in said latter device are in the position shown in full lines. As soon as any one of these switches is operated from this full line position, current at the upper pole of the switch S—84 is cut off, so that power to the relay switches 157, 24 and 24a in the automatic tip distancing device will be cut off and said latter device rendered inoperative. This tie-up of the two devices as indicated not only prevents conflicting power from being applied to the crosshead motor 54 in a manner tending to rotate said motor in both directions, but allows a manual adjustment of the tip height at any time even though the automatic control is operable.

The operation of the relay coil 158 controlling the switch 157 is dependent upon the operation of the solenoid valve 132 controlling the supply of high pressure cutting oxygen to the tip 10. This relay coil 158 is electrically connected in parallel with the solenoid of this valve, so that this coil is not energized until the coil of the valve 132 is energized and said valve opened. Thus the automatic tip distancing device is not operated until actual cutting begins, as this is when the assistance of this device is needed. When relay coil 158 is energized, the switch 157 as well as a switch 164 in the anode circuits of the two tubes 14 and 14a are closed.

A further switch 165 controlled from the main panel 76 may be provided in the circuit of the relay coil 158. This switch 165 may be of the toggle type, and serves to disconnect the automatic tip distancing device when it is desired not to use said device. With this switch 165 opened, the opening of the solenoid valve 132 will not initiate the operation of the automatic tip distancing device.

The distance between the upper and lower limits of travel of the tip under automatic control is extremely narrow, and in most instances, current is supplied only for a fraction of a second at any one time to the crosshead motor 54 while said tip is under such control. Under these conditions, the armature of the crosshead motor 54 might only rotate a few revolutions at any one time to automatically correct the height of the tip, and might overrun by its inertia as much as one-half a revolution after current to said motor was shut off. It is therefore highly desirable to prevent this overtravel of the motor 54. For that purpose, there is provided a solenoid brake comprising a brake drum 166 (Figs. 6 and 7) on the armature of the crosshead motor 54 and a brake shoe 167 carried by a brake arm 168 pivoted at one end at 169. A spring 170 fixed at its ends to the motor frame and the brake arm 168 respectively, urges the brake shoe 167 into braking contact with the brake drum 166. A solenoid 171 has a plunger 172 connected to the free end of the brake arm 168. This solenoid 171 is electrically connected in parallel with the crosshead motor 54 across the points 104 and 105 as shown in Fig. 8.

While current to the crosshead motor 54 is interrupted, the solenoid 171 is deenergized, and the brake shoe 167 is held against the brake drum 166 by the spring 170. As soon as current starts to flow to the motor 54, the solenoid 171 is energized, and the brake shoe 167 is pulled away from the brake drum 166 to permit said motor to rotate.

With the solenoid brake described, it has been found in actual operations that the overtravel of the torch tip after current to the motor 54 has been disconnected and the solenoid brake applied is not more than ten thousands (0.010) of an inch.

The electrical connection 26 to each torch is desirably in the form of an insulated spring wire, one end of which is plugged into a socket 173 mounted on the frame of the manifold unit 125 in the rear of the carriage 40 as shown in Fig. 3, while the other end is plugged into electrical contact with a bracket 174 mounted on the top of the metal torch barrel 12 as shown in Fig. 4. This bracket 174 is in electrical contact with the torch frame 12, and serves also as a mounting plate for the ends of gas supply hose 126. The spring wire 26 serves not only as the electrical connection to the torch barrel 12 and the tip 10, but also serves as a support for the flexible gas supply hose 126.

The plate 11 to be cut is grounded by a wire 176. This ground connection to the plate 11 may be effected by simply laying said plate on the work table 45 which is electrically connected to the machine supporting table 41 by a metallic strap 177. Consequently, the entire cutting machine and the work table 45 are all connected together, and the automatic tip distancing units are grounded to the machine carriage. This is the equivalent of electrically connecting them to the metal plate 11 being flame cut.

There is a separate automatic tip distancing device for each crosshead unit 44, and each device is desirably mounted as a self-contained unit enclosed in a casing 178 with a removable cover as shown in Fig. 3 and as is indicated by the dot and dash line in Fig. 8. These units are mounted in the rear of the carriage 40, the cover of one of these units being shown removed in Fig. 3 to reveal part of the interior thereof. A series of male plugs 180 projecting from the side of each casing 178 permits easy electrical connection to each of the automatic tip distancing devices. These plugs 180 form connections to the wires extending across the casing outline indicated by the dot and dash line in Fig. 8.

With the automatic height controlling device described, no adjustments need be made over a wide range of tip sizes covering a wide range of plate thicknesses. As the thickness of the plate to be cut increases, there must be an increased volume of preheating gases passed per unit of time to raise the temperature of the metal to the kindling temperature. The preheating orifices which are annularly located about the central cutting orifice, increase in total cross-sectional area to provide the required amount of heat. With an increase in total cross-sectional area, the cross-sectional area of any one of the preheating cones of the flame is increased, and the electrical conductivity of the flame correspondingly increased. As more preheat gas is passed per unit of time in a larger sized tip, there is a slight increase in the flame cone lengths. This longer length of flame path tends to decrease its electrical conductivity, and compensates for the increase in the total cross-sectional area of the flame cone tending to increase in this conductivity. Even though the actual distance from the ends of the cutting tips to the plate does increase with increase in tip size, yet the distance from the end of the preheating cones of the flame to the plate 11 being cut remains constant. For this reason, it is possible to maintain optimum cutting conditions for various sizes of tips by maintaining the torch tip between horizontal upper and lower limits, the spacing between these limits depending on the sensitivity with which adjustments in the potentiometer sliders 27 and 27a are made. Once these limits are established, no adjustments need to be made over a wide range of tip sizes covering a wide range of plate thicknesses. The automatic tip distancing control maintains the lowest surface of the various tips within these vertical limits even though the surface of the plate 11 being cut is uneven and non-horizontal through warpage, through tilting of the top of the work table 45, or through variation in the thickness of said plate over its area.

The tip distancing device may be used as an audible or visible indicator of cutting conditions. For instance, with a hand welding or cutting torch, the two relays 23 and 23a can be made to control two buzzers whose tones are different, these buzzers being connected to respective headphones. After optimum cutting or welding conditions are initially established, there would be no buzzer sounds as long as these conditions are maintained. If the operator should hold his torch too close to the work, one of the buzzers would sound, and if he should hold the torch too far away, the other buzzer would sound, thereby warning the operator. Such a device could, for instance, be useful in the training of novices.

As a simple means for accomplishing this result a relay coil 240 may be included in a line leading from the switch 24a, and a relay coil 244 may be inserted in the line leading from the switch 24.

As shown in Fig. 8, the energizing of the coil 240 will close the switch 241 and permit a current to flow from a battery through either a buzzer 242 or a lamp 243. These are shown as arranged in parallel with each other and in series with the switch 241. By providing suitable switches in the lines leading to the lamp and the buzzer, either or both may be operated upon closing the switch 241.

Similarly, a buzzer 246 and a lamp 247 are arranged in parallel with each other and in series with the same battery, and with a switch 245 which is closed by the energizing of the coil 244. If the torch moves too close to the workpiece, one of the coils will be energized to actuate the lamp and/or buzzer, and if the torch moves too far away from the workpiece the other lamp and/or buzzer will be actuated.

As many changes can be made in the above method and apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. The method of controlling the spacing of a torch tip from a workpiece with which the flame from said tip engages, which comprises the steps of passing electric current through the torch flame and between the torch tip and the work surface, and automatically controlling the movement of said cutting torch tip toward and from said workpiece in response to changes in the electric conductivity of said flame.

2. An apparatus for controlling the operation of a torch device, including means for passing electric current through the torch flame and between the torch tip and a metal work surface, and means automatically responsive to variations in the electric conductivity of said flame for operating a part of said device.

3. In an apparatus for controlling the operation of a torch device, the combination comprising means for passing electric current through the torch flame and between the torch tip and a metal work surface, an electric control circuit, and means for breaking or making said circuit automatically in response to variations in the electric conductivity of said flame.

4. An apparatus for controlling the spacing of a torch from a workpiece, including means for moving said torch towards and from the workpiece, means for passing electric current through the torch flame, means automatically responsive to variations in the electric conductivity of said flame for actuating said first mentioned means, and means visually indicating changes in the electric conductivity of said flame.

5. In an apparatus for controlling the operation of a torch device, the combination comprising means for passing electric current through the torch flame and between the torch tip and a metal work surface, an electric control circuit, a thermionic valve in said control circuit, and means for rendering said valve conducting upon variation of the electric conductivity of said flame from a predetermined value to make said circuit.

6. In an apparatus for controlling the operation of a torch device, the combination comprising means for passing electric current through the torch flame and between the torch tip and a metal work surface, a pair of electric control circuits, means for automatically changing the current conditions in one of said circuits when the electric conductivity of said flame decreases below a predetermined value, and means for automatically changing the current conditions in the other circuit when said flame conductivity increases above a predetermined value.

7. In an apparatus for controlling the operation of a torch device, the combination comprising means for passing electric current through the torch flame and between the torch tip and a metal work surface, a pair of electric control circuits, each including a thermionic valve, means for altering the conductive capacity of one of said valves when the electric conductivity of said flame decreases below a predetermined value, whereby said valve is changed from conductive to non-conductive or non-conductive to conductive, and means for altering the conductive capacity of the other valve when said flame conductivity increases above a predetermined value to render the valve conductive or non-conductive.

8. An apparatus for maintaining a torch tip in position between predetermined spaced limits parallel to a metal work surface, comprising means for passing electric current along the gas flame from said torch tip to said surface, and means responsive to variations in the electric conductivity of said flame resulting from variations in the position of said torch tip beyond said limits for restoring said tip into position between said limits.

9. In a torch tip distancing device, the combination comprising an electric circuit having a connection to said tip and another to a metal workpiece, whereby the gas flame emitted from said tip serves as a part of the conducting path of said circuit, a thermionic valve responsive to variations in the conductivity of said flame resulting from a change in the tip to workpiece spacing beyond a predetermined value, and means controlled from said valve for displacing said tip in a direction to restore said spacing towards said predetermined value.

10. An apparatus for controlling the operation of a torch device, including a pair of circuits, a pair of thermionic tubes in said circuits respectively, said tubes being of the type which become non-conductive when the controlling voltages impressed thereon exceed a predetermined negative value, and which become conductive when the controlling voltages impressed thereon drop below said predetermined negative value, the torch tip and a metal workpiece upon which said tip operates being connected in the circuits of said tubes, whereby the flame between said torch tip and said workpiece forms part of the conducting path of said circuits and the voltages impressed on said tubes depend on the conductivity of said flame, and means for automatically operating a part of said device according to the conductive or non-conductive condition of said tubes.

11. An apparatus for controlling the operation of a torch device, including a pair of circuits, a pair of thermionic tubes in said circuits respectively, said tubes being of the type which become non-conductive when the controlling voltages impressed thereon exceed a predetermined negative value and which become conductive when the controlling voltages impressed thereon drop below said predetermined negative value, the torch tip and a metal workpiece upon which said tip operates being connected in the circuits of said tubes, whereby the flame between said torch tip and said workpiece forms part of the conducting path of said circuits and the voltages impressed on said tubes depend on the conductivity of said flame, means for adjusting the controlling potential in each of said circuits whereby the sensitivity of said tubes can be adjusted and the two limits of conductivity of the flame beyond which said tubes become conducting or non-conducting is established, and means automatically responsive to changes in the conductive condition of said tubes resulting from changes in the conductivity of said flame beyond said limits for operating a part of said device.

12. An apparatus for maintaining a torch tip in position between predetermined spaced limits parallel to the surface of a workpiece being operated on, comprising a pair of circuits, a pair of thermionic tubes in said circuits respectively, said tubes being of the type which become non-conductive when the controlling voltages impressed thereon exceed a predetermined negative value, and which become conductive when the controlling voltages impressed thereon drop below said predetermined negative value, said torch tip and said workpiece being connected in the circuits of said tubes, whereby the operating flame between said torch tip and said workpiece forms part of the conducting path of said circuits, and the voltages impressed on said tubes depend on the distance of the torch tip from said workpiece, means for adjusting the controlling potential in each of said circuits whereby the sensitivity of said tubes can be adjusted and the two limits of conductivity of the flame beyond which said tubes become conducting or non-conducting to conform with said predetermined spaced limits can be established, and means automatically responsive to changes in the conductive condition of said tubes resulting from the displacement of said torch tip beyond said predetermined spaced limits for restoring said torch tip to a position within said limits.

13. In combination, a device for automatically maintaining a flame cutting torch tip at a predetermined distance from a workpiece to be cut, a valve for controlling flow of cutting oxygen to said torch tip, and means for automatically rendering said device inoperative while said valve is closed, and for automatically initiating the operation of said device upon the opening of said valve.

14. In combination, a manually controlled device for regulating the distance of a torch tip from a work surface, an automatic device for maintaining a torch tip at a predetermined distance from said work surface during operations, and means for automatically rendering said automatic device inoperative while said manually controlled device is being operated.

15. An apparatus for controlling the flow of cutting oxygen to a torch, comprising a cutting oxygen valve, means for heating a workpiece to be cut with a preheating flame, and electrical means for automatically opening said valve when the thermionic emission of said preheated workpiece adding algebraically to the conductivity of the flame between said torch and said workpiece reaches a predetermined value.

16. The method of maintaining a torch tip in positions between predetermined limiting distances from a workpiece, which comprises the steps of passing electric current through the torch flame between the torch tip and the workpiece, and automatically moving the torch tip into positions between said limits when the conductivity of the flame is greater or less within a limited range of values.

17. The method of controlling the operation of metal cutting by a torch flame, which includes the steps of applying a preheating flame from a torch tip to a workpiece, passing an electric current through the flame between the torch tip and the workpiece, and automatically initiating the delivery of cutting oxygen against the preheated area of the workpiece when the thermionic emission of the preheated workpiece added algebraically to the conductivity of the flame reaches a predetermined value.

CHESTER MOTT.
ALFRED F. CHOUINARD.
R. L. HARDING.